July 28, 1970  A. A. BRAGA-ILLA ET AL  3,521,835
SYNCHRONOUS SATELLITE

Filed June 5, 1967  7 Sheets-Sheet 1

FIG. I

INVENTORS
WALTER E. MORROW, Jr
ALVISE A. BRAGA-ILLA
BY,
ATTORNEY

United States Patent Office 3,521,835
Patented July 28, 1970

3,521,835
SYNCHRONOUS SATELLITE
Alvise A. Braga-Illa, Cambridge, and Walter E. Morrow, Jr., Weston, Mass., assignors to Massachusetts Institute of Technology, Cambridge, Mass., a corporation of Massachusetts
Filed June 5, 1967, Ser. No. 643,493
Int. Cl. B64g 1/00
U.S. Cl. 244—1                                    3 Claims

ABSTRACT OF THE DISCLOSURE

A control system for synchronous satellites which produces control signals with the coincidence of optical signals from two celestial bodies and an ephemeris corrected-time signal corresponding to a segment of an orbit with a programmed on-board impulse rocket response to said signals to maintain orbit synchronism.

---

Satellites have been used for communication purposes for a considerable period of time. Communication is accomplished most commonly by microwave signals requiring line-of-sight transmission. Obviously, one cannot communicate directly between New York and California, owing to the curvature of the earth. Use of a satellite permits direct communication by reflecting signals on the satellite, or by retransmitting the signals received by the satellite. In the past, a difficulty with this type of communication system has been that the satellite would drift out of sight of the desired stations; consequently, more than one satellite was required to allow the stations to communicate at all times. A transmitting station would first search and lock on to a satellite, transmit to it for a short period of time, until that satellite drifted out of view, latch on to a second satellite and continue to use it until it too drifted out of range. To avoid the need of several satellites, synchronous satellites were developed. A synchronous satellite is located at a preselected distance above the earth in an equatorial orbit moving in a direction in agreement with the rotation of the earth. The velocity of the satellite at the preselected distance is such that the satellite maintains a constant station at some point above the earth; therefore, signals emanating from a transmitting station can be received by a synchronous satellite continuously and retransmitted to a terminal station. Assuming that a satellite remains synchronous, there is no need for elaborate tracking equipment to search the satellite and track it until it drifts out of range. A comparatively simple tracking mechanism is required once the link between a given transmitting station and a receiving station has been established. The problem with such a satellite is that in reality it cannot remain synchronous for long periods of time.

Before this invention was made, to maintain a satellite in synchronism with the earth, above a given point over the earth's surface, ground signals had to be generated from time to time, which would actuate on-board satellite motors to advance or retard the satellite in orbit to its proper station. Obvious difficulties with this scheme are the requirement for substantial tracking equipment and to monitor its position and determine whether the satellite is at a particular station and the need of command signals from the ground. The present invention contemplates a system on board the satellite which maintains the station automatically.

In order to station-keep a satellite with an acceptable degree of accuracy, several problems must be overcome. The first difficulty is the determination of the degree of synchronism that the satellite is maintaining with the earth. The inventors have discovered a simple means for determining the position of the satellite relative to the station by comparing the time of coincidence of pulses generated by an earth sensing device and a sun sensing device, which are at a known angle to one another, with the time of occurrence of a pulse generated within the satellite at a time having a fixed relation to the solar transit time of the desired station-keeping longitude. Wherever coincidence occurs between the earth sensing pulse, the sun sensing pulse and the internal time pulse, synchronism is assured.

During most days of the year, the solar transit time over a given earth longitude does not occur at mean solar noon. This is caused by the inclination of the ecliptic plane to the equatorial plane and by the eccentricity of the orbit in which the earth moves around the sun.

The time of coincidence of the pulses from the earth sensor and the sun sensor on the satellite clearly has a fixed relation to the solar transit time over the station-keeping longitude whenever the earth's and satellite's equatorial planes coincide. For this reason, the pulse generated internally to the satellite must be obtained from a true solar clock. A true solar clock can be approximated by electronically adjusting the time of a constant speed clock in accordance with the day of the year.

It has also been discovered that a single sun sensor, using the variation of the sun's latitude in satellite coordinates will convert the solar transit time to mean solar time. This sun sensor can then be used in conjunction with an earth sensor and a constant speed clock.

Another problem with synchronous satellites in their assuming a constant position with respect to the transmitting and receiving station, is that the orbit will not, in general, be exactly circular. The inventors have discovered that they can extend the principle of coincidence of pulses from an earth sensor, a sun sensor, and a clock, to avoid the measurement error due to orbital ellipticity. This is accomplished by using two sun sensors, located at 180° on the satellite equator, and an earth sensor, so as to define two coincidences at opposite points in the orbit, or alternatively, two earth sensors and one sun sensor. It has been shown that the average of the longitude differences between the satellite and the desired station measured at these two opposite points is free of the error due to eccentricity, to first approximation.

The inventors have also discovered a simple way of describing an orbit, by measuring the times in which the satellite travels four consecutive 90° sectors, measured in earth-centered coordinates. With such information, a simple scheme has been devised to actuate the satellite motors in such a way as to automatically circularize the orbit, within the limits set by the measurement accuracy.

The direction and magnitude of the disturbing force which tends to move the satellite away from the station depend on the longitude of the station with which synchronism must be maintained. Furthermore, this force is conservative; so that a satellite which passes at the desired station longitude with a certain relative drift velocity, will continue to oscillate about the station with a constant amplitude of oscillation. In consequence, the inventors have discovered that motor control must be bi-directional, that is, the motor must be capable of firing along the tangent to the orbit both in favor and against the instantaneous satellite velocity, to effectively control a satellite's position. Furthermore, they have discovered that it is necessary to fire these motors by means of a preselected program that eliminates hunting. The motor is at first fired in an appropriate direction causing the satellite to pass the station. Then the motor fires in the opposite direction with reduced impulse, causing the satellite to pass at the station again with smaller relative velocity than previously. Accordingly, several motor firings with successively reduced impulses finally bring the satellite to the station with negligible drift velocity.

The inventors have discovered that, by changing the time of occurrence of the pulses generated by the satellite clock while preserving the appropriate spacing between successive pulses, a station having a different longitude can automatically be selected, because the coincidence-between the clock pulse, the earth pulse, and the sun pulse will now only occur when the satellite moves in synchronism with the new station and has the same longitude.

An important advantage of the present invention is its independence of ground signals. This advantage is manifest from both a military standpoint and an economic standpoint. Militarily, communication satellites according to the present invention will be free from control signals that may be spoofed by an enemy which will defeat the utility of the satellite. Economically, a satellite in accordance with the present invention obviates the need for elaborate tracking systems. Eventually, there will be great numbers of synchronous satellites in orbit about the earth, serving a variety of communication needs. The number of satellites that will be able to operate in synchronous orbit depends, among other things, on their angular separation. As satellite separations decrease, the difficulties and costs of tracking from the ground with high precision and of having frequent commands to the satellite motors increase greatly. Accordingly, automatic station keeping contemplated by the present invention and which is independent of ground tracking will ultimately be mandatory.

Therefore, an object of this invention is to provide an automatic satellite station-keeping system.

Another object of this invention is to provide a station-keeping satellite that is completely self-contained in the satellite.

Another object of this invention is to provide a sensor of the mean solar transit time, henceforth called "ephemeris detector."

Another object of this invention is to provide a controlled motor firing scheme that will eliminate hunting of the satellite as it zeroes in on its station.

Another object of this invention is to provide a station-keeping satellite that utilizes a comparison of pulses from a true solar clock, the sun or a star and an earth-sensing signal as a satellite control.

Another object of this invention is to provide a synchronous satellite that is capable of changing station with a simple signal from the earth, or in a way programmed internally.

Another object of this invention is to provide a satellite control system that will incorporate a damping system such that optimal control of the satellite is achieved with minimum fuel.

Another object of this invention is to provide simple on-board methods of measurement of the parameters of the orbit of the satellite, for application in station-keeping and other orientation, stabilization or pointing systems.

Another object of this invention is to provide methods of controlling the period of a satellite on a circular orbit.

Another object of this invention is to provide methods of automatically circulatizing the orbits of earth satellites.

Other objects, features and advantages of the present invention will be made more apparent from the following specification when read in connection with the attached drawings, of which:

FIG. 1 is an overall view of a synchronous satellite in an equatorial orbit.

FIGS. 2a, 2b, 2c, and 2d are top views of orbits showing various points in orbit with respect to the earth and sun.

Figure 1:
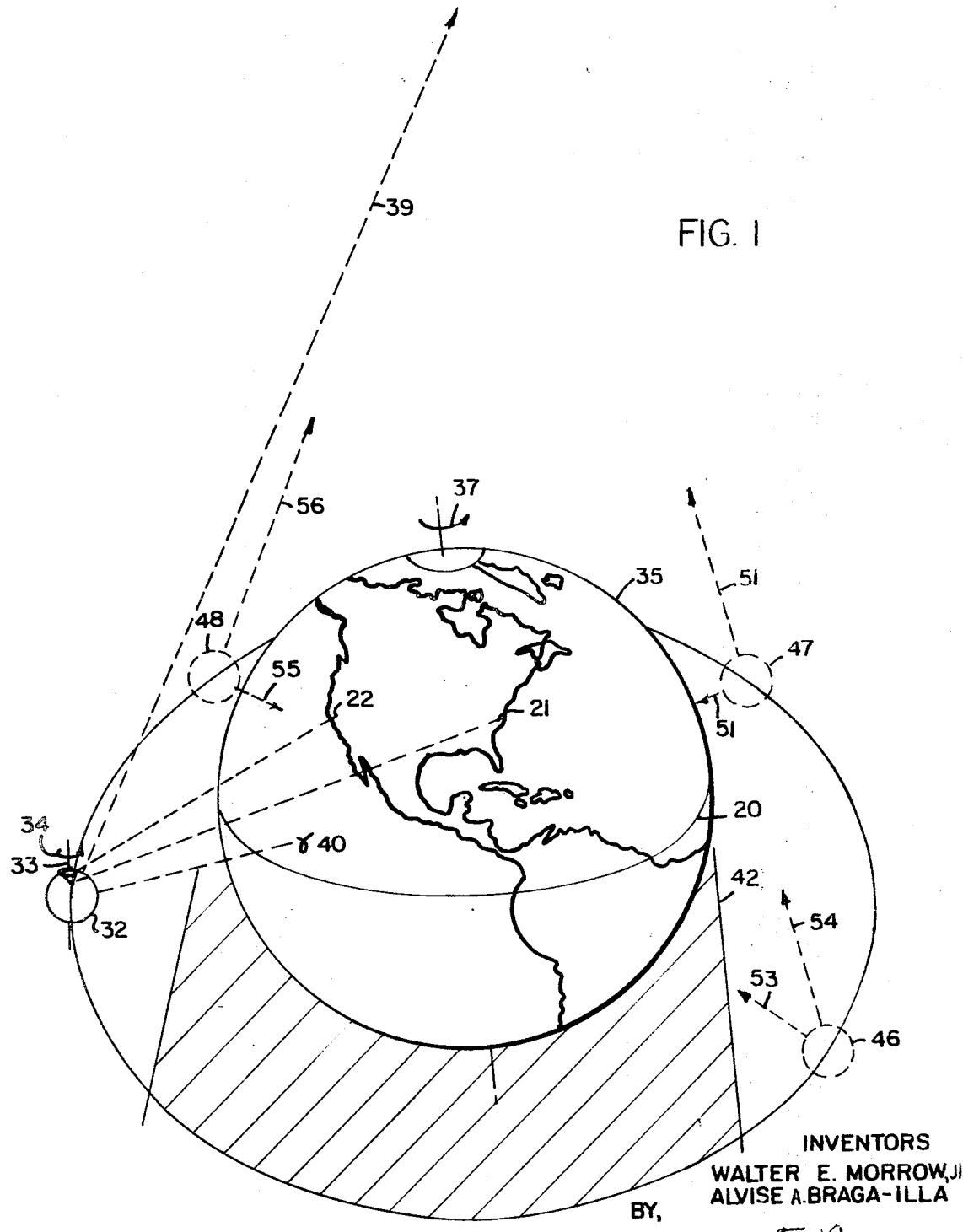

Referring to FIG. 1, the earth is shown at 35, a plane disecting the earth is shown through equator 20, the earth is shown revolving about its axis 37. Two points in the U.S. 21 and 22 are shown, suggesting two stations in California and New York. The sun is indicated as 36 and the geosynchronous satellite, in its equatorial orbit around the earth, as 32. The two points on the earth are connected to the satellite by means of two dotted lines. Points 21 and 22 are directed to antenna 33. The satellite is shown in four different places, as 46, 47 and 48, which are imagined positions arbitrarily selected. We note that the satellite is in a unique position in orbit when arrow 39 points to the sun and arrow 40 points to the earth center simultaneously. The three imaginary positions are similarly defined by the directions of the arrows pointing to the sun and earth center.

The satellite is geosynchronous, that is the satellite moves around the earth at the same angular speed with which the earth revolves about its axis. Accordingly, the satellite remains over a fixed station with respect to the earth. Therefore, signals generated at point 21 can be directed with assurance to a satellite antenna 33 and the signals will be redirected to the earth at point 22.

The satellite may be spin-stabilized and revolve about an axis 34. This is described in more detail in the following. The position of the axis of rotation can be made normal to the equatorial plane in which the orbit lies. With the satellite in a fixed position over the earth, rotating at a determinable rate, antennas placed about the circumference of the satellite can be switched systematically so that an active antenna faces the earth continuously. However, other non-spin stabilized satellites can be used, utilizing the features of this invention but not requiring antenna switching.

Owing to the lack of spherical symmetry of the earth gravitational field, the satellite tends to drift away from its geosynchronous position. Thus, some means must be provided to accelerate or decelerate the satellite to adjust its position over a given station.

Figure 2:
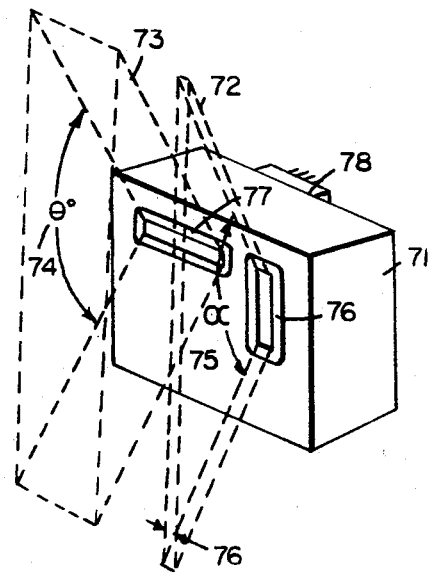

An essential element therefore of the present invention is the determination of satellite position with respect to a given earth station. Every 24 hours the earth will have completed one revolution; and the satellite should pass through a unique position, as described above and shown in FIG. 1. Every twenty four hours, a time signal and a satellite's position signal can be compared to determine whether the satellite has drifted out of the synchronous position. To determine the satellite longitudinal position with respect to the earth, two sensors are used which are mounted on the circumference of the satellite. One sensor is sensitive to the earth and can determine the direction of the center of the earth. This sensor can be an infrared detector; however, an optical earth sensor can also be used and will be described further. The second sensor is typically an optical sensor which detects the direction of the sun. Obviously, when the sun and earth center form a given angle as seen from the satellite, a unique position in orbit is thereby determined. Accordingly then, the coincidence in time of the pulses generated by a sun sensor and an earth sensor will define a unique position of the satellite in its orbit. Several other positions can be established by means of additional detectors, as shown in FIG. 2. Then, with an earth sensor and four sun sensors, four unique points in an orbit can be established. Four unique positions are used to completely define an entire orbit of a satellite, as will be seen.

The following is a description of the sun and earth sensors used to determine satellite position.

Four sun sensors, as shown in FIG. 2, have a Gray-coded reticle 73 which measures ±64° of sun elevation in 1° intervals. They also have a command reticle which is a beam 1° wide 76 and 128° in elevation 75. The latter beam serves to enable the electronics to read the Gray code. The beams are symmetric (±64°) with respect to the satellite equator. The material which senses the light in this sensor is cadmium sulfide, but any of a number of substances could have been used effectively.

The four sun sensors are mounted along the circumference of the satellite at 90° intervals from one another.

Figure 3:
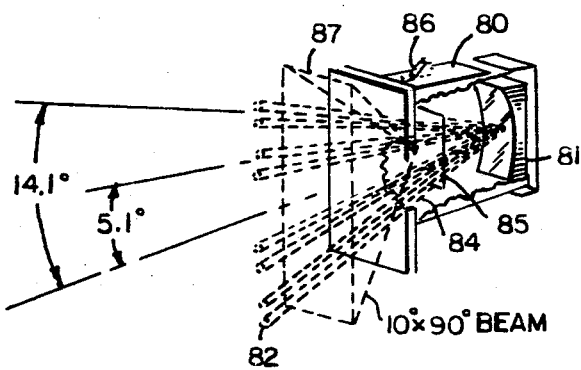
FIG. 3 is an illustration of the automatic circularizing technique.

The earth sensor consists of two equal sensors, one of which is shown in FIG. 3. They are identical except for the manner in which their electronics is connected. One is connected to trigger from the edge of the earth which is seen first as the satellite rotates, and the other from the opposite edge. This requirement will be discussed more fully later. The sensors have a series of slits and baffles to control scattered light and define the beam pattern. These two sensors operate on reflective optics. The optics consist of a spherical mirror 81 mounted behind the sensor 80. They have four sets of double pencil beams 82. Each pencil is 1° square. The pencil beams in a doublet are spaced 1° measured between beam edges for moon lockout, as will be seen. Both sensors have doublets at ±5.1° and ±4.1° from the satellite equator. They also have a sun lockout system, obtained by use of two photo diodes looking directly out from the sensors. This lockout blocks all earth pulses whenever the sun is within ±5° of the sensor azimuthal axis and ±45° in elevation. Their output is a binary signal, being 0 volts for less than 2% earth albedo and +6 volts for greater than 2% albedo. The sun lockout signal is also a binary signal, where −6 volts indicates no sun and 0 volts is the output when the sun is seen by the sensor.

The two halves of the earth sensor are mounted at an angular distance of 18°16′, which corresponds to the earth subtense as seen from a satellite at an altitude of 18,200 n.m. The earth sensor can be located at any position along the satellite periphery, provided that it is distant enough from any sun sensor so that none of the four orbital positions falls in the earth's shadow cone.

Both the earth and sun sensors operate in the visible optical range. This means that the information concerning the earth position must be processed, to take into account the phases of the earth as seen from the satellite.

Figure 4:
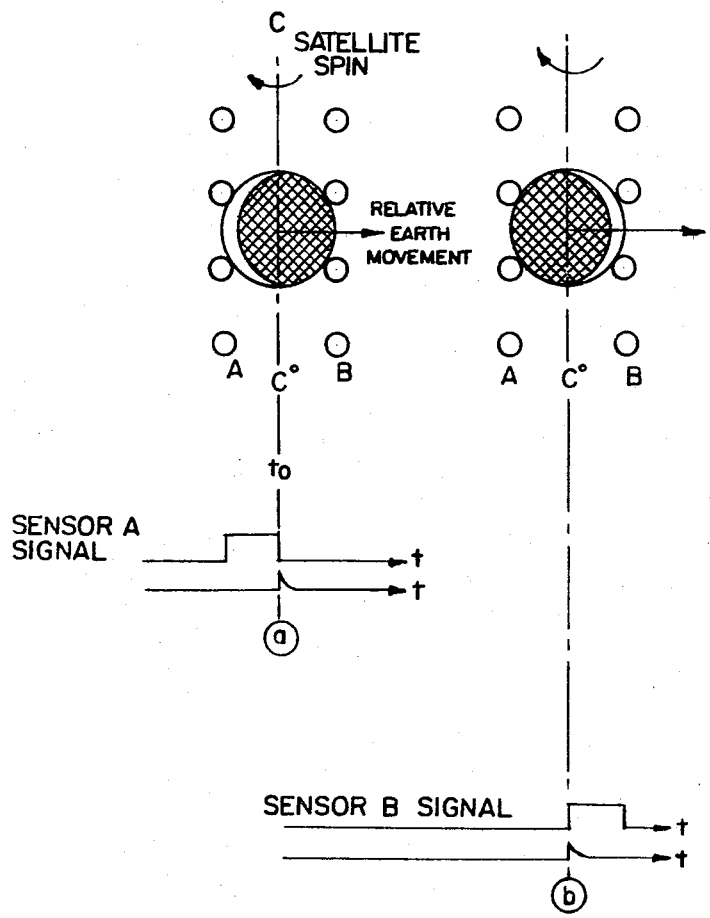
FIG. 4 is an illustration of a sun sensor.

FIG. 4 shows a cylindrical projection of the earth sensor superimposed to the earth's projection from the satellite center for a given orbital position. The illuminated portion of the earth may either lead or trail the dark portion when seen from the revolving satellite; this corresponds to the situations illustrated in FIGS. 4a and 4b. The figures show the sensing pulses obtained from the sensors A and B. Also shown are pulses derived from the trailing edge of the signal from sensor A and the leading edge from sensor B. It is clear that alignment of the earth center with the earth sensor axis c–c° occurs at the trailing edge from sensor A in case 4a, and at the leading edge from sensor B in case 4b.

Figure 5:
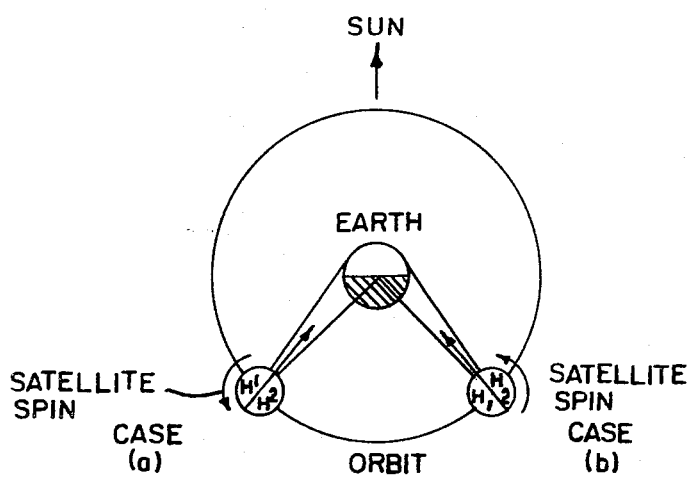
FIG. 5 is an illustration of an earth sensor.

It is then necessary to distinguish the two situations. FIG. 5 shows the satellite position for the two cases; the arrow pointing from the satellite to the earth denotes the meridian location of the c–c° axis. By extending the c–c° axis around the satellite, we divide the satellite into the two hemispheres, $H_1$ and $H_2$. Therefore, it is apparent that when the satellite-sun line intersects hemisphere $H_1$, we should operate from the trailing edge from sensor A; when the intersection is with hemisphere $H_2$, we should operate from the leading edge from sensor B. The appropriate gating information for these pulses is derived from the sun sensors on the satellite. In this way, a pulse is obtained at the time in which the earth center, the satellite center and the axis of the earth sensor are in line.

A problem encountered in an earth sensor is that it delivers pulses whenever passing in front of the sun and moon. This problem does not exist for the sun sensors because of the much lower amplitudes of the earth and moon signals compared to that from the sun.

The problem of spurious signals from the sun into the composite earth sensor is made worse by sun scattering in the earth sensor itself. This causes the angular width of the sun to appear much larger than it is when observed with a non-scattering optical system.

This is the reason for the sun lock-out signal which is derived from the photo diodes mounted inside the earth sensor to gate out the pulse that the sun generates in the latter.

The problem of discriminating the moon signal is solved by feeding each doublet pencil beam output into an AND gate. Since the moon is ½° wide and the pencil beams in a doublet are 1° apart, the moon signal cannot trigger the earth sensor.

Having thus established four distinct points in an orbit, which completely define that orbit, and having thus described the sun and earth sensors which will accurately establish these four points with the proper selection of electronics, this information can be used in the complete control of a satellite. However, as was alluded to earlier, the time of arrival of the signals produced by the coincidence of outputs from the earth and sun sensors must be compared with the time of a pulse which corresponds to the position of the desired station. The apparent motion of the sun relative to the earth is not uniform, so that successive passes of the sun at the zenith of a given longitude do not occur after equal time intervals. This motion is described in the ephemeric tables. Accordingly, at mean noon, the earth and sun are seen at slightly varying angles during the year by an observer on the satellite and the internal time pulse, when compared with the time of this fix of coincident sun and earth signals, will result in a slight error. To compensate for this error, a precise internal electronic clock must be used having a built-in ephemeris variation which will advance or retard the time of occurrence of the output pulse relative to the mean solar time. Such a clock has to be started at a predetermined day because the ephemeris variation is peculiar to a period of time within a given year. This variation being cyclic, the clock accordingly must be started at the proper point in the cycle to properly match the ephemeris variation to provide necessary correction.

Figure 6A:
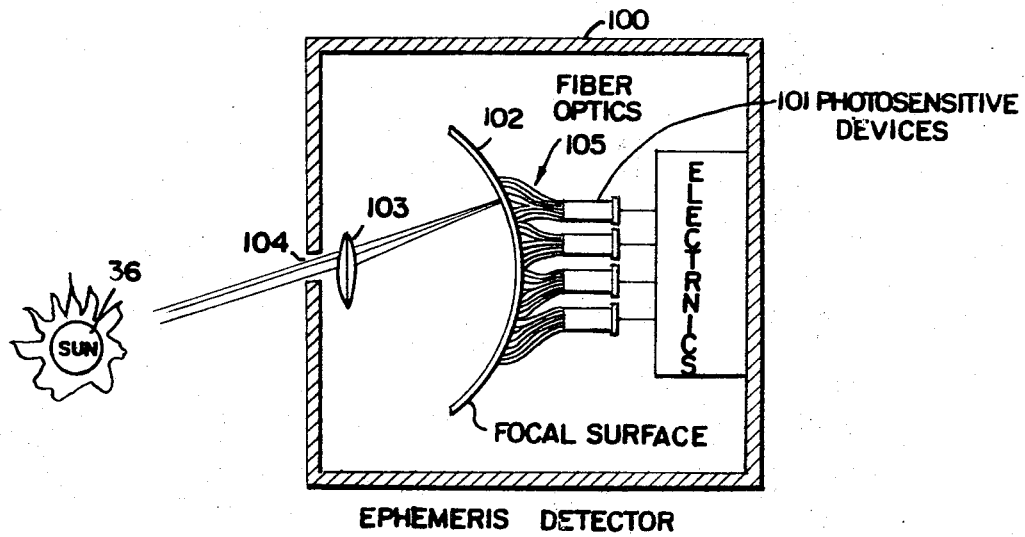
FIGS. 6 and 7 are illustration of the earth finding problem.

An alternative to a clock having a built-in electronic system, which compensates for the ephemeric variation, is the use of an ephemeric detector, a special sun sensor which will correct for the ephemeric variation. Referring to FIG. 6a, we see a sensor 100. The sensor has an opening 104; and 36 causes rays to enter the opening and pass through a lens 103. The focal surface of the lens is curved and is shown as 102. Fiber optic conductors of light 105 feed light received at various points of the focal surface to an array of photosensitive devices 101.

Figure 6B:
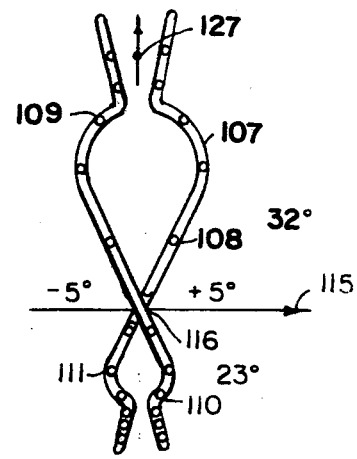

Referring to FIG. 6b, we see an appropriately modified version of the earth's analemma. The focal plane is designed so that the analemma appears etched thereon for a width of ½°, and of course the fiber optic devices are affixed at various points on the analemma. The top part of the analemma corresponds to the summer solstice and the lower part refers to the winter solstice. The axis having an arrow at point 115 indicates the satellite longitude variation direction. The axis having an arrow at point 127 indicates the satellite latitude variation direction. During the year, the sun appears at different latitudes, seen from the satellite. At the summer solstice the sun latitude is approximately 23½° and the summer to winter swing is 47°. The analemma describes the longitudinal position of the sun at mean solar noon of each day of the year. This position varies by as much as ±4° during a year. Since the satellite lifetime is of a few years only, the secular variation of the analemma is disregarded. A dead band at the end of each solstice of about 15° in latitude is provided to take into account the fact that the satellite spin axis may be somewhat tilted with respect to the normal of the orbit. Thus, as the earth and sun move with relationship to one another, the sun longitude signal emanating from the detector will advance or retard in automatic correspondence with the ephemeris variation. That is, at points 108 and 110, which correspond to different days during the year, the light from the sun entering the analemma sensor will strike the right side of 107 at different times and cause a pulse to be generated which, when coincident with the earth pulse, will produce the signal which defines the satellite position. The pulse from the right part of the 107 analemma sensor will be used between the vernal equinox and the summer solstice and between the winter solstice and the autumn equinox. During the rest of the year, the pulse from the other half of the sensor will be utilized. As the sun crosses the equinox 116 and goes to point 110, the time at which the sun causes a pulse to be generated in the sensor will be earlier and again at 111 it will be later, thus returning to point 108 and closing the yearly cycle. Accordingly, the sun sensor signal varies in time in compliance with the ephemeric difference between mean and true solar time.

Figure 7A:
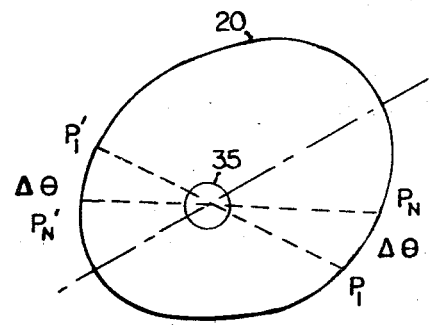

When the orbit is elliptical with eccentricity $e$, the measurement of satellite position is affected by the variable angular velocity of the satellite in its orbit. FIG. 7a shows an elliptic orbit 20 around the earth 35. Point $P_1$ indicates the position at which the earth and sun sensor output coincidence occurs on a given day. In successive days of the year, the points coincidence moves along the orbit by an angle $\Delta\theta$ to $P_N$ in FIG. 7a because of the sun motion relative to the orbit and of the procession of orbital perigee. Considering the component contributed by sun motion, the time $t_N$ between the first and N-th coincidence is, for a satellite of period T, $$t_N = NT + \Delta t$$

where $\Delta t$ is the time in which the radius vector traces the arc $\Delta\theta$ by which the sun has displaced itself during the N revolutions of the satellite. For a synchronous satellite $\Delta$ is a function of time with yearly period, and corresponds to a longitude error of peak amplitude.

$$\Delta = 114.5\ e \text{ degrees}$$

$e$ being the eccentricity of the orbit.

It can be shown that the satellite position measurement errors made at points $P_1$ and $P_1'$, in FIG. 7a, due to the motion of the fix point relative to the satellite orbit, are equal and opposite to first order in eccentricity.

The points $P_1$ and $P_1'$, $P_N$ and $P_N'$ are opposed to each other with respect to the focus of the ellipse.

Therefore, the measurement of satellite longitude is performed twice per orbit at positions 180° away from each other. The measured positions are summed and divided by two to eliminate the error due to orbital eccentricity. This technique is effective for eccentricities as high as 0.1.

The preceding discussion has shown how the satellite position relative to the desired station-keeping longitude can be measured, in such a way as to eliminate the error due to the sun ephemeris variation and to orbital eccentricity. The satellite can now be controlled so as to remain at the station-keeping earth longitude. The following describes the motor firing program necessary to station-keep at all values of earth longitude and to damp the oscillations of the satellite about the desired station. If the satellite is spin-stabilized and therefore rotates around one of its symmetry axes, the motor must be turned on only for a fraction of a rotation. Accordingly, the motor is turned on when the satellite is oriented in the proper direction to accelerate the satellite or to retard the satellite. If the satellite is equipped with only one motor, it can be fired after 180° of satellite rotation to obtain bi-directional control of the spacecraft.

Figure 8:
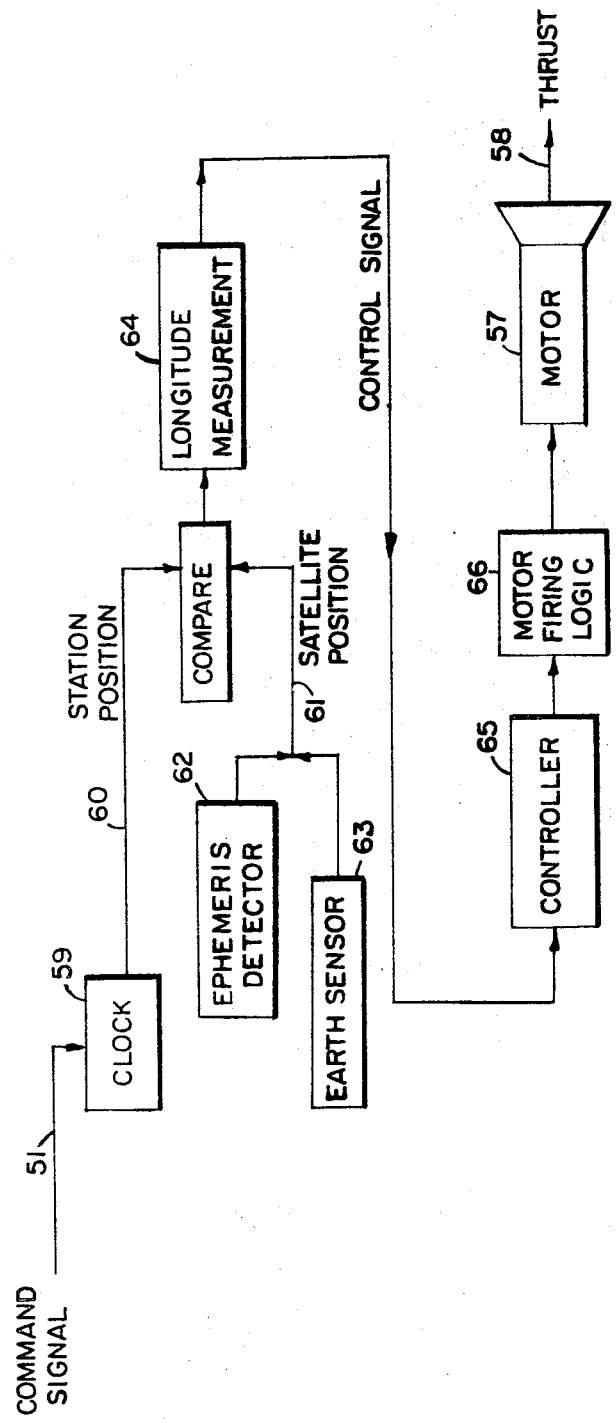
FIG. 8 is an ephemeris detector.

Referring to FIG. 8, we see a block diagram of a motor control. A clock 59 generates pulses which corresponds to a precise station location every 12-hour period. A sun ephemeris detector 62 generates a pulse which must be coincident with a pulse from the earth sensor 63 to cause a satellite position signal to appear at the junction 61. The times of arrival of the clock and coincidence pulses are compared. If the coincidence pulse defining the satellite position arrives before the clock pulse that defines the station position, a signal will cause the longitude measurement device 64 to send a retard signal to the controller 65. If the opposite occurs, no advance signal is sent. The position of the satellite is measured twice a day and the retard or advance signal is sent in accordance with the average of these two measurements.

The controller 65 fires the motor with an appropriate sequence, as will be described.

The motor firing logic 66 causes the motor 57 to fire, thus creating a thrust 58 at precise points in its rotation. If the satellite is to accelerate, its orbital period is reduced, which is accomplished by firing the motor in the direction of the tangent to the orbit, opposing the satellite's instantaneous velocity. The firing angle, i.e., the fraction of satellite rotation for which the motor is operated, is therefore made symmetric with respect to the orbit tangent. The latter is a line perpendicular to the satellite-earth line, since the orbit is circular. The firing angle in this system has been made 18°. If the satellite is to be retarded, the motor will not be permitted to fire until 180° later for the same firing angle. The command signal 51 will be received from time to time to change the station-keeping location if need be. This is accomplished by re-starting the clock at the time at which the desired station on the earth passes at the longitude or point $p$, in FIG. 2c, i.e., when the solar time of the new station equals the time at which the coincidence between earth and sun sensors is taken. In this system, 9 a.m. (mean solar time of the station) has been arbitrarily selected as the time of the coincidence $p$, in FIG. 2c. Thus, if one desired to station-keep over New York City, the clock is started at 9 a.m., New York City mean solar time.

Figure 9:
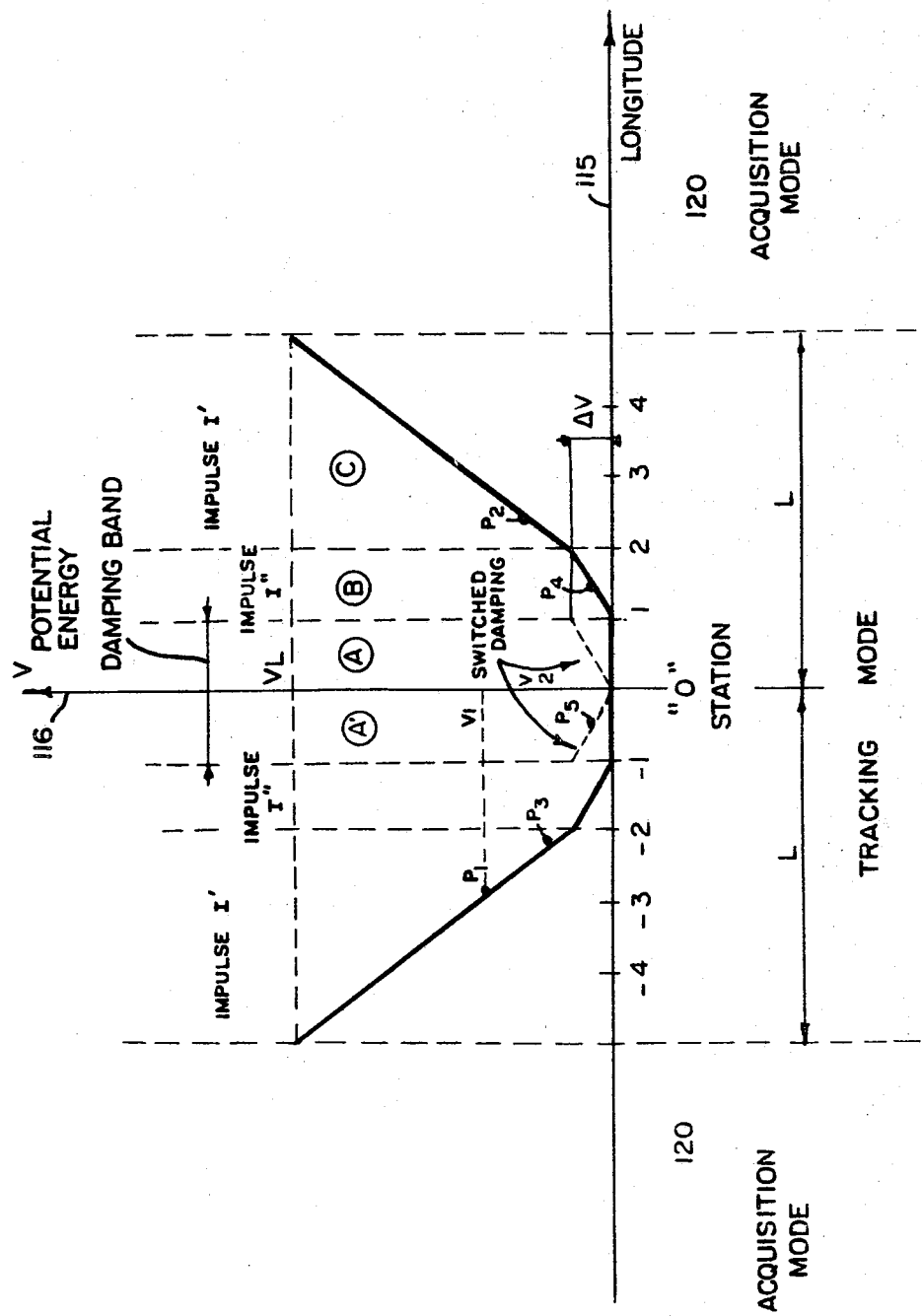
FIG. 9 is a block diagram of the satellite control system.

FIG. 9 shows a diagram of a program of impulses suitable to control the station-keeping of the satellite. Axis 115 shows satellite relative longitude and it is calibrated in positive or negative degrees of longitude from the station.

The vertical axis 116 shows satellite relative potential energy due to the motors being operated to give a constant impulse per day. When the impulses are small and therefore the daily satellite drift is small, the drift kinetic energy of the satellite caused by the motors varies linearly with relative longitude. For simplicity of discussion, FIG. 9 has been drawn for a station at which the external distributing force is nearly zero. The satellite is in the acquisition mode 120 until the I' drifts within the range ±5° of the station position. When the satellite arrives within one of the bands −2° to −3°, +2° to +5°, the motor applies a constant impulse per day to the satellite; within the −2° to −1°, or the +1° to +2° band a constant, but lesser impulse per day is applied. In the −1° to +1° range, no impulse is applied except as specified in the following. This value of the deadband is acceptable for station-keeping communication satellites and could be narrowed further.

To best understand how damping is achieved in the tracking mode, we shall use an example. Assume that after station acquisition the satellite has a residual drift energy $V_1$. Then it will drift away from the station until the motors have removed an equal drift energy. Thus, the satellite will reach position $P_1$, in FIG. 9, with zero relative energy. From this moment, the satellite is again accelerated by the motor until it passes through the damping band and at that point the motor starts firing in the opposite direction. The satellite overshoots the desired position and arrives at point $P_2$ with zero velocity and potential energy $V_2$. As the satellite passes through the damping band again, the rockets operate in the opposite direction causing the satellite to be decelerated until it arrives at point $P_3$ beyond the desired position. Each time the satellite passes through the damping band, its potential energy is decreased by $\Delta V$, until it remains within the damping band with an energy smaller or equal to $\Delta V$. At this point, the value of the damping impulses is reduced by one half and the damping cycle resumes until the residual energy is equal or smaller than ½ $\Delta V$. This succession continues until the residual energy reaches a sufficiently small value ½ $\Delta V$.

To fully automate the operations performed on a satellite, the following measurements are required: the period or the average angular velocity relative to the earth, the eccentricity; the position of the orbit major axis, and the satellite longitude in a geometric reference frame.

The measurement of the angular velocity relative to the earth is necessary, for instance, in electronic switching of antennas on a spinning communication satellite. Satellite longitude, orbital eccentricity and major axis location must be measured to control the satellite position or the characteristics of its orbit with closed-loop systems.

The previous description has shown how the satellite position can be measured. The following methods, accurate for small eccentricities, have been discovered to measure eccentricity, period and position of the major axis of the orbit.

These methods are based on the following properties of satellite motion on an ellipse, accurate to the first order in the eccentricity:

(i) The sum of two orbital instantaneous angular velocities measured at points $P_1$ and $P_1'$ opposed with respect to the focus (FIG. 7a) equals twice the average orbital velocity $\omega$.

Figure 7B:
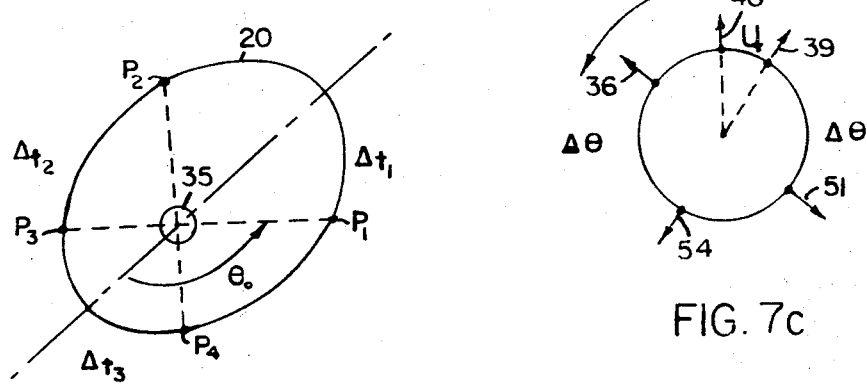

(ii) If the times $\Delta t_1$, $\Delta t_2$, $\Delta t_3$ in which the satellite moves over three consecutive 90° arcs of trajectory are measured (FIG. 7b), the following reconstruction of the satellite law of motion can be implemented:

$$\theta \equiv \omega t - \tfrac{1}{2}\omega(\Delta t_2 - \Delta t_3)(1 - \cos \omega t) + \tfrac{1}{2}\omega(\Delta t_2 - \Delta t_1) \sin \omega t \quad (1)$$

where $\theta$=satellite anomaly, with reference to the anomaly at $P_1$ in FIG. 7b, $\omega$=satellite average orbital velocity. Moreover, the position $\theta_0$ of the ellipse major axis relative to the point $P_1$ in FIG. 7b is $$\theta_0 = tg^{-1} \frac{\Delta t_2 - \Delta t_3}{\Delta t_2 - \Delta t_1} \quad (2)$$

and the orbital eccentricity is $$e = \frac{1}{4} \frac{\omega}{\sin \theta_0} (\Delta t_2 - \Delta t_3) \quad (3)$$

These properties and equations can be demonstrated easily by using a law of satellite motion correct to terms in $e$.

Figure 7C:
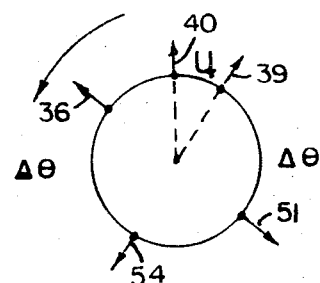

The orbital period can therefore be measured by using one earth sensor and four sun sensors whose line of sight have the angular relationships shown in FIG. 7c. The angle $\psi$ is arbitrary, except for the requirement that none of the four coincidence points should fall in the earth's shadow cone 42, FIG. 1. The orbital period follows from property (1):

$$T = 2(\Delta t_1 + \Delta t_3) \quad (4)$$

By virtue of (ii), the law of motion can be reconstructed electronically, and the eccentricity and the position of the major axis can be computed using time measurements only.

Equations 2 and 3 could be used to measure eccentricity. This information can be used in an automatic system to reduce or control eccentricity.

The inventors have discovered a simple technique to automatically circularize an orbit, which is described as follows:

Having established orbital fixes at points at four places $P_1$, $P_2$, $P_3$, $P_4$, which are 90° apart from each other and appropriately located with respect to the sun, let $\Delta t_1$, $\Delta t_2$ and $\Delta t_3$ be the times in which the satellite moves along three consecutive 90° sectors, when $$\Delta t_1 > \Delta t_2 > \Delta t_3 \quad (5)$$

apogee is between $P_1$ and $P_2$, when $$\Delta t_2 > \Delta t_1 \quad (6)$$
$$\Delta t_2 > \Delta t_3$$

apogee is between $P_2$ and $P_3$, when $$\Delta t_3 > \Delta t_2 > \Delta t_1 \quad (7)$$

apogee is between $P_3$ and $P_4$, and when $$\Delta t_2 < \Delta t_1 \quad (8)$$
$$\Delta t_2 < \Delta t_3$$

apogee is between $P_4$ and $P_1$.

In the boundary case $$T_1 > T_2 = T_3 \quad (9)$$

apogee is at $P_1$, and similar relations hold when apogee is at $P_2$, $P_3$ and $P_4$.

The station-keeping control action is applied symmetrically about the orbital focus, so that the eccentricity is not modified. For convenience, if $F_p$ is the station-keeping control force along the orbit tangent, ¼$F_p$ shall be applied four times per orbit, at points $P_1$ through $P_4$.

In order to change the orbital eccentricity without affecting the satellite period, the net tangential force applied during one orbit must be zero. An eccentricity control action $+F_s$ is thus applied at each of the two fix points which encompass apogee, followed by an action $-F_e$ at the two points encompassing perigee. This system of forces $\pm F_e$ tends to circularize the orbit and does not modify the satellite period. In the boundary cases, e.g. (9) the control action is modified simply. The time comparisons (5) through (8) are repeated and the corrective action $\pm F_e$ is applied until $$T_1 = T_2 = T_3 \quad (10)$$

within the limits of accuracy of the sensors. $F_e$ can be designed to satisfy fuel constraints or other requirements.

Figure 10:
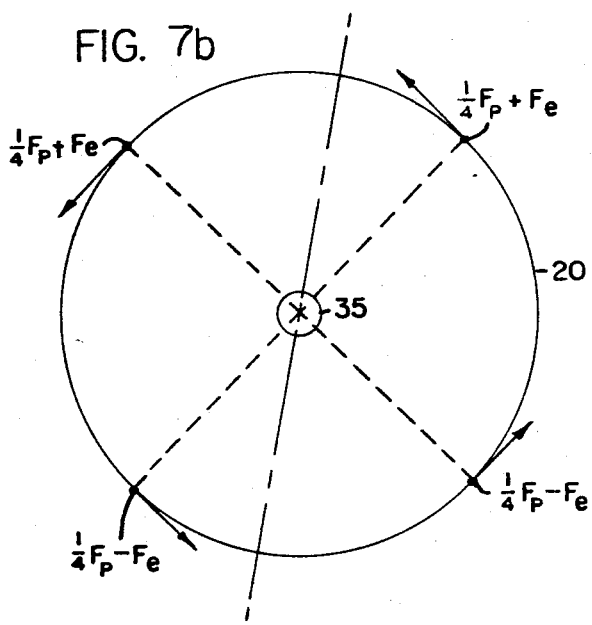
FIG. 10 is a schematic view of the various switching modes that the rockets will undergo, to zero the satellite onto a station.

If the station-keeping correction $F_p$ and the circularizing correction $\pm F_e$ are superimposed, the system of forces shown in FIG. 10 results.

The advantages of this technique are:

(1) There is no interaction between the station-keeping and the circularizing control loops;

(2) No complicated computations are involved; and (3) The system is of the "null-seeking" type, which ensures high accuracy.

We have thus described a control system for station keeping a satellite. The system first requires precise fixing of points in a given orbit. The measurements made at these points can be first corrected for ellipticity of the orbit. Second, these precise fixes can be corrected for sun ephemeris variation. Third, the complete orbit can be described using measurements made at four points and controlled by applying two systems of impulses on the satellite, the first to eliminate ellipticity, and the second to station-keep the satellite. Station-keeping of the satellite can be again programmed so that the satellite is accelerated and decelerated to eventually reach the precise location of the station. Many substitutions and variations in the aforementioned or afore-described invention can be made without departing from the true scope and spirit of the present invention.

We claim:

1. The method of automatic satellite orbital control, which method includes the steps of:
sighting a preselected celestial body, sighting a second preselected celestial body at a fixed angle relative to the first sighting,
generating a signal at the time of coincidence of said sightings,
comparing the appearance of said generated signal with a pulse generated by an internal clock corresponding to an interval of flight equal to the period of rotation of the earth so that the satellite is synchronous with the earth.
producing an error-correcting signal in accordance with the difference in occurrence of said pulses,
generating a second error-correcting signal each orbit at a preselected interval from the first error-correcting signal,
averaging the error-correcting signals to produce a third error-correcting signal free of the effects of orbital ellipticity.

2. The method of automatic satellite orbital control according to claim 1 which further includes grating earth sightings to produce doublet beams 1° apart, which lock out moon signals.

3. The method of automatic satellite orbital control according to claim 2 which further includes blocking spurious signals by gating the output in accordance with a second direct detection of the sun with a pre-calibrated sun detector.

References Cited

UNITED STATES PATENTS

| | | | |
|---|---|---|---|
| 3,239,674 | 3/1966 | Aroyan | 250—203 |
| 3,286,953 | 11/1966 | Dryden | 244—1 |
| 3,290,933 | 12/1966 | Lillestrand et al. | 73—178 |
| 3,301,508 | 1/1967 | Yamron | 244—3.18 |
| 3,350,548 | 10/1967 | Whitaker | 235—150.2 X |

MILTON BUCHLER, Primary Examiner

J. L. FORMAN, Assistant Examiner

U.S. Cl. X.R.

244—3.18